United States Patent [19]
Lupattelli et al.

[11] 4,042,784
[45] Aug. 16, 1977

[54] DIGIT STORER FOR TELECOMMUNICATION SYSTEM

[75] Inventors: Carlo Lupattelli; Alfredo Miotti, both of Milan, Italy

[73] Assignee: Societa Italiana Telecomunicazioni SIEMENS, S.p.A., Milan, Italy

[21] Appl. No.: 626,876

[22] Filed: Oct. 29, 1975

[30] Foreign Application Priority Data

Oct. 29, 1974 Italy .................................. 28899/74

[51] Int. Cl.² ............................................. H04Q 1/30
[52] U.S. Cl. .............................................. 179/18 EB
[58] Field of Search .......... 179/18 EB, 18 D, 18 DA, 179/18 E, 18 AD, 90 BB, 16 EA, 16 F

[56] References Cited

U.S. PATENT DOCUMENTS

| | | | |
|---|---|---|---|
| 3,671,677 | 6/1972 | Lee, Jr. et al. ................. | 179/18 DA |
| 3,725,598 | 4/1973 | Braun et al. ...................... | 179/18 EB |
| 3,851,110 | 11/1974 | Kelly et al. ...................... | 179/18 EB |
| 3,931,476 | 1/1976 | Matthews ........................ | 179/18 AD |

*Primary Examiner*—Thomas W. Brown
*Attorney, Agent, or Firm*—Karl F. Ross; Herbert Dubno

[57] ABSTRACT

A storage network co-operating with a marker comprises a shift register whose stages are loaded in parallel with the digits of a call number received from a local subscriber, the first digit or digits of that call number being read out to an associated marker as an identification of a remote junction to which the call is to be extended via a transmission path selected under the control of that marker. When the marker has received enough digits to perform the switching operation linking the subscriber line with the selected transmission path, it activates a pulse generator which energizes an output lead in parallel with a counter whose reading is successively compared with the remaining digits still stored in some of the stages of the shift register. A comparator making this comparison, upon detecting a match between the pulse count and a stored digit, blocks the further readout of pulses to the output lead for an interdigit pause determined by a timer. At the end of that interval, the timer controls the switchover of one of the comparator inputs to the next shift-register stage and resets the counter whereupon the procedure is repeated until all the digits have been read out. The pulse rate and the interdigit pause may be modified, under the control of the marker, according to the selected junction.

4 Claims, 3 Drawing Figures

DIGIT STORER FOR TELECOMMUNICATION SYSTEM

FIELD OF THE INVENTION

Our present invention relates to a telephone or other telecommunication system wherein a multiplicity of lines from local subscribers or possibly from more distant locations, adapted to initiate outgoing calls to destinations identified by multidigit numbers, are temporarily connectible to transmission paths leading to remote junctions from which the calls may be further extended. The temporary connection is established by switch means under the control of a marker in response to the first digit or digits of a call number arriving over a line to which the marker has been assigned for that particular call, these digits being stored in a register upon arriving over the calling line.

BACKGROUND OF THE INVENTION

The use of such temporarily assignable markers and registers is well known per se. Reference in this connection may be made, for example, to U.S. Pat. Nos. 3,328,534 and 3,524,934. In these conventional systems, especially those operating electronically rather than electromechanically, it is generally necessary to store several or possibly all of the digits making up a call number before the marker is summoned. Such call numbers usually include upwards of seven digits, depending on whether local, intercity or international communications are involved. This deferred engagement of the marker delays the establishment of a connection to the desired remote junction from which the call is extended to the desired party.

In our copendng application Ser. No. 626,875 of even date, whose disclosure is hereby incorporated by reference into the present description, we have described a marker for the control of the aforementioned switch means co-operating with a register designed to store at least the characteristic portion of a call number upon being engaged by a calling line, this marker including a first memory connected to the register and a second memory addressable from the first memory via a decoder in order to read out operating instructions for a circuit controlling the operation of the switch means. The first memory is provided with a multiplicity of first cells addressable by respective digits and digit combinations stored in the register, each of these first cells containing a code word falling into one of several categories. The first of these categories encompasses the contents of cells addressed by digits or digit combinations completely identifying a remote junction; a second category encompasses the contents of cells addressed by digits or digit combinations with incomplete junction identifications. Advantageously, there is also a third category for the contents of cells addressed by digits or digit combinations identifying nonexisting junctions. Code words in the first category result in the energization of a first decoder output by an identification signal which addresses one of a multiplicity of second cells in the second memory, according to the characteristic portion received by the first memory. A code word in the second category energizes a second decoder output to generate a request signal which is fed back to the register for calling forth a further digit. A third decoder output may be energized by a code word in the third category to emit a busy signal.

OBJECTS OF THE INVENTION

An object of our present invention is to provide means in such a telecommunication system for temporarily storing the digits of a call number and, upon reading out the characteristic portion of that call number to an associated marker, for directly retransmitting the remaining digits to the selected remote junction upon the establishment of a connection thereto.

Another object of this invention is to enable changes in the speed of retransmission, the waveform of the digital pulses and/or length of the interdigit pauses according to the type or the length of a selected transmission path serving the desired junction.

SUMMARY OF THE INVENTION

A storage means for the digits of a call number, embodying our present invention, comprises a multistage register whose stages are loaded by a distributor with respective digits of a call number received from an associated line, one or more of these digits constituting the aforementioned characteristic portion and being transferred to an associated marker with the aid of circuitry such as that described in the above-identified copending application. Upon reception of this characteristic portion, and establishment of the desired connection, the marker activates a generator of a train of readout pulses which has an output lead extending to that connection for transmitting these readout pulses over the selected transmission path to the remote junction. The pulses are also received by a pulse counter whose count is fed to a first input of a comparator having a second input which is successively connectible, by way of a multiplexer, to the several register stages. A gate in the output lead of the pulse generator blocks the transmission of readout pulses to the remote junction as soon as the comparator detects a match between the pulse count and the contents of the register stage connected to it, such a match also starting a timer which deactivates the counter during a predetermined but preferably adjustable interdigit pause and thereupon actuates the multiplexer for connecting the next register stage to the second comparator input, with concurrent unblocking of the gate in the output lead of the pulse generator whereby the next digit stored in the register can be transmitted in like manner over the established connection.

An output circuit of marker, originating at a switch-control circuit thereof, may extend to the timer and/or the pulse generator for modifying the duration of the interdigit pauses and/or the cadence or duty cycle of the train of readout pulses according to the nature of that connection.

BRIEF DESCRIPTION OF THE DRAWING

The above and other features of our invention will now be described in detail with reference to the accompanying drawing in which.

SPECIFIC DESCRIPTION

Figure 1:
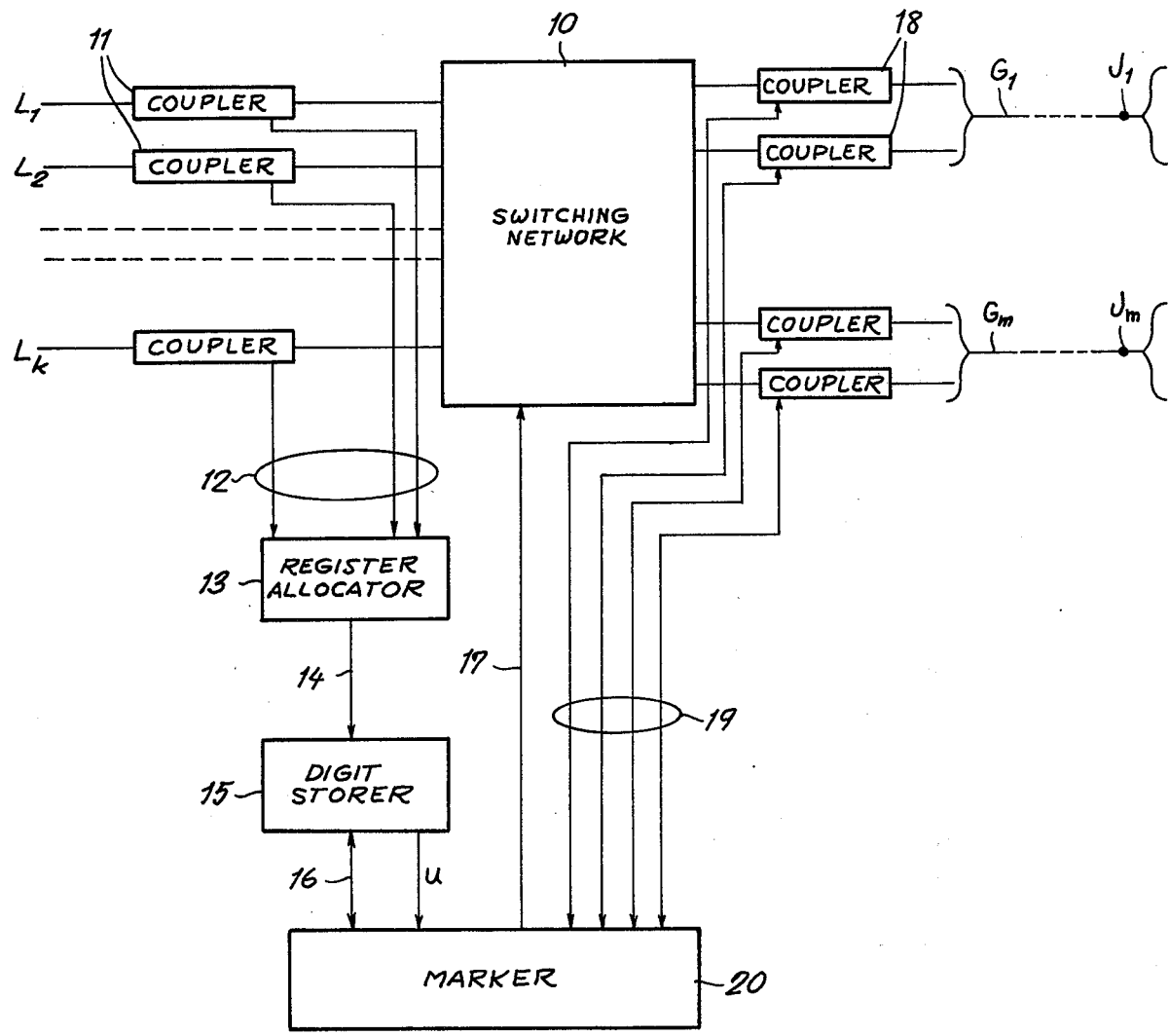
FIG. 1 is a diagram of part of a central office in a telecommunication system equipped with a marker and an associated storage circuit for call-number digits embodying our invention.

FIG. 1 shows part of a telephone exchange with local lines $L_1, L_2, \ldots L_k$ (referred to hereinafter as subscriber lines) terminating at a switching network or line concentrator 10 from which an outgoing call may be extended to a lesser number of remote junctions $J_1 \ldots J_m$ via respective groups of transmission paths $G_1 \ldots G_m$ (referred to hereinafter as channels). Each group may include a number of direct trunks and certain circuitous routes. It should be understood that these channels need not have separate physical existences but could be represented by different carrier frequencies, especially within a given group. Naturally, the same network 10 also operates as a line distributor in the case of incoming calls originating at lines associated with junctions $J_1$-$J_m$ and destined for subscribed lines $L_1$-$L_k$.

Each subscriber line $L_1$ - $L_k$ includes a coupler 11 which, in the usual manner, monitors its activity and summons a digit storer 15 via an allocator 13 and a lead 14 upon the initiation of a call by a local subscriber. Circuit 15, whose construction is described in detail hereinafter with reference to FIG. 3, receives and stores the digits dialed by the subscriber, including those constituting the characteristic portion of a call number identifying one of the junctions $J_1$ - $J_m$.

Figure 2:
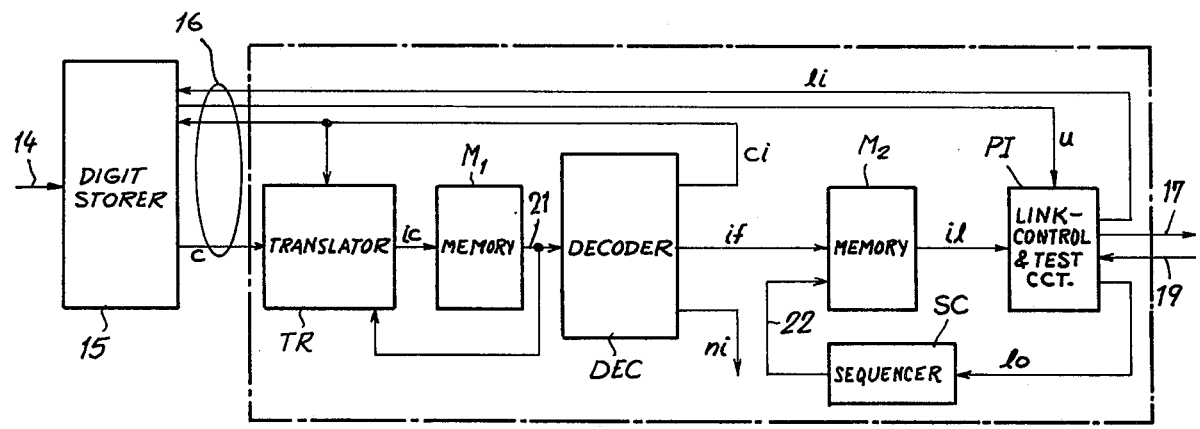
FIG. 2 is a block diagram showing details of the marker.

Storage circuit 15 is connected via a two-way link 16 with a marker 20 more fully illustrated in FIG. 2. The marker controls the operation of switching network 10 via a lead 17 and communicates by way of leads 19 with a set of two-way couplers 18 inserted in the respective channels for the purpose of determining their availability. If a call is to pass through, say, junction $J_1$ and the first channel of group $G_1$ is not available, the marker tests the second channel of the group and so on until an idle channel is found; if none exists, a busy signal is sent to the calling subscriber in the conventional manner, via the corresponding coupler 11 and over circuits not further illustrated.

FIG. 2 shows details of marker 20 whose connections with storage circuit 15, encompassed within link 16, include a multiple $c$ for the feeding of stored digits to a translator TR within the marker, a lead $ci$ for feeding back a request signal to circuit 15, a lead $li$ carrying an availability signal as soon as a free outgoing channel has been found and seized in the group extending to the selected junction, and a lead $u$ for the transmission of stored digits to that junction over the channel just seized. Translator TR works via a connection $ic$ into a first memory $M_1$ with a number of cells corresponding to all the possible digits and digital combinations making up a characteristic portion of a call number. The contents of these cells are divided into three categories of code words which, upon being fed to a decoder DEC via a connection 21, energize one of three outputs $if$, $ci$ and $ni$ thereof. Output $if$, when energized, carries a junction-identifying signal to a second memory $M_2$, thereby addressing one of the cells thereof in accordance with the code word in the first category read out from one of the cells of memory $M_1$. Output $ci$, already referred to above, carries the aforementioned request signal in response to a code word in the second category, namely on reception of one or more digits from storage circuit 15 which constitute less than a complete characteristic portion. Output $ni$, energized by a code word in the third category read out from a cell of memory $M_1$ in response to a digit or digits incompatible with a characteristic portion identifying an existing junction, emits a busy signal by way of the corresponding coupler 11 (FIG. 1) to the calling subscriber.

Whenever an identification signal on decoder output $if$ addresses one of the cells of memory $M_2$, the contents of that cell are read out over a multiple $il$ to a link-control and test circuit PI which, via conductors 17 and 19, determines whether the first channel of a group serving the selected junction is available. If this is the case, circuit PI energizes the lead $li$ which directs the transmission of the remaining digits stored in circuit 15 to the selected channel over a signal path including lead $u$, circuit PI, one of the leads 19 and the corresponding coupler 18 (FIG. 1); it will be understood, however, that lead $u$ could also be extended to the selected channel via a switch in network 10 without passing through the marker.

If, on the other hand, the initially chosen channel is already busy, an output lead $lo$ of circuit PI triggers a sequencer SC which then energizes a lead 22 extending back to memory $M_2$. Lead 22 carries a signal which supplements the identifying signal on output $if$ to address an adjacent cell in that memory, within a set of such cells assigned to the channels of a corresponding group, in order to test the next channel of that group for its availability. If that channel is also busy, sequencer SC increments the signal on its output lead 22 to address a third cell of the set, and so forth until an idle channel is found, causing energization of lead $li$, or the last channel has been explored and found busy, with resulting energization of lead $lo$.

The operation just described can be carried out with the aid of a logical adder and a third memory in translator TR as described and illustrated in our above-identified copending application.

Figure 3:
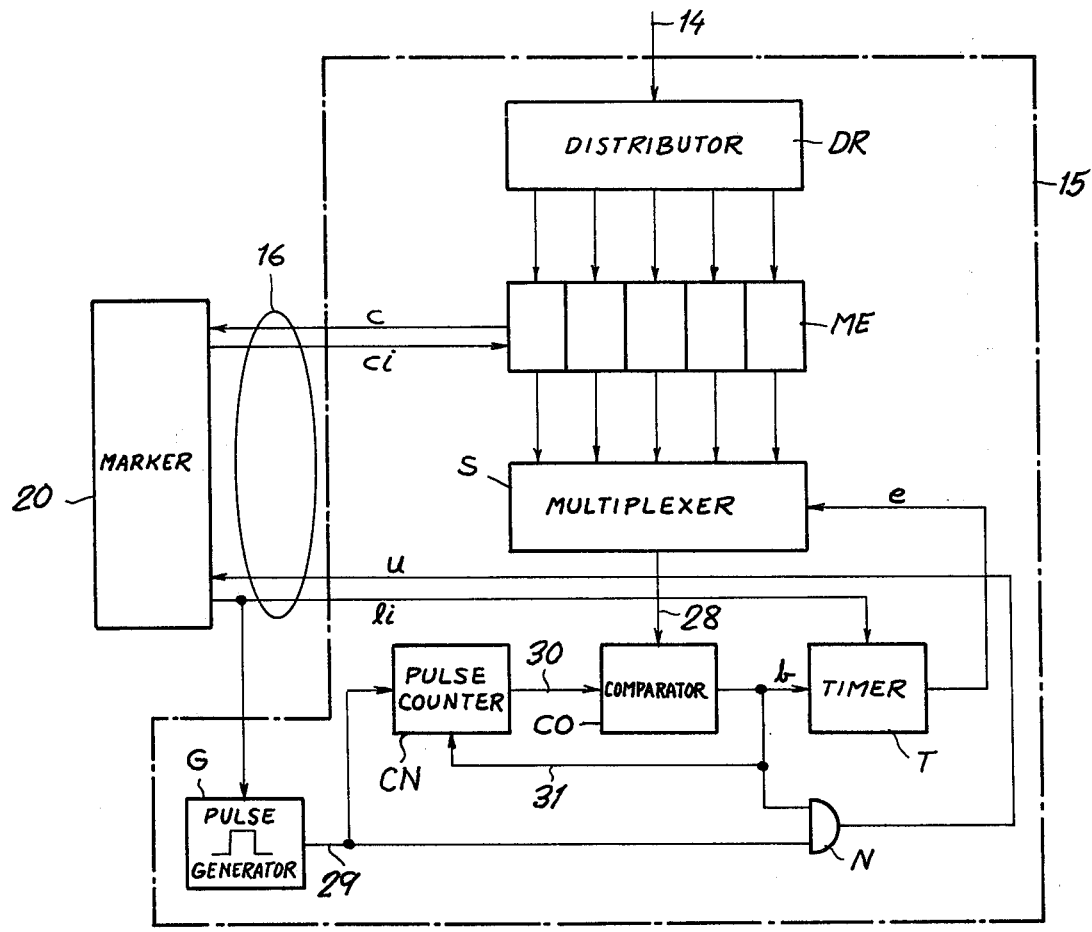
FIG. 3 is a more detailed circuit diagram of the digit storer shown in FIG. 1.

We shall now refer to FIG. 3 for a detailed description of the digit storer 15 embodying our invention. This circuit comprises a distributor DR of conventional design which delivers the successive digits of a call number, dialed in by way of lead 14, to respective stages of a shift register ME. The number of stages of that register equals the maximum number of digits to be dialed, yet only six stages have been shown for the sake of simplicity. A conventional digit detector, not shown, reads the contents of the first stage via multiple $c$ into marker 20 as soon as the first digit has been received. If that digit is insufficient to identify a remote junction reachable through channels associated with network 10 of FIG. 1, a request signal on lead $ci$ calls forth the contents of the second stage as soon as the next digit is dialed in, and so on until the characteristic portion is complete and a channel serving the desired junction is seized as indicated by the energization of lead $li$. This lead terminates at a pulse generator G and, in parallel therewith, at a timer T which thereupon, via a lead $e$, actuates a multiplexer S for connecting register stage No. 1 to an input multiple 28 of a comparator CO. An output lead 29 of pulse generator G terminates at a stepping input of a pulse counter CN and, in parallel therewith, at an AND gate N whose output is the lead $u$. Pulse counter CN works into another input multiple 30 of comparator CO whose output lead $b$ extends to the timer T as well as to another input of AND gate N. A branch 31 of lead $b$ is connected to a resetting input of counter CN.

Since the characteristic portion of the stored call number has already been read out from shift register ME, its first stage now contains the first of the remaining digits which are to be retransmitted over the seized channel. As the counter CN registers a zero at this time, the appearance of that digit on comparator input 28 unblocks the AND gate N so that a train of reading pulses on output lead 29 of generator G can pass through that gate to lead u and thence to the remote junction. As soon as the comparator CO detects a match between the reading of counter CN and the digit on its input 28, gate N is blocked and timer T is started to measure an interdigit pause with concurrent resetting of the counter whereby the continuing operation of pulse generator G is made ineffectual. At the end of the pause, multiplexer S is again actuated to shift the comparator input 28 to the next stage of register ME, comparator output $b$ is re-energized and gate N is unblocked for the transmission of another pulse train to its remote destination. When the last digit has been retransmitted in this manner, both inputs of comparator CO are at zero and gate N remains blocked; pulse generator 29 may continue operating ineffectually until it is cut off by the de-energization of lead $li$ upon the release of marker 20. Multiplexer S reverts to its starting position under the control of the aforementioned digit detector upon the next loading of register ME.

If connection $li$ is a multiple instead of a single conductor, the configuration of its signal upon establishment of an outgoing connection can be utilized to modify the operation of pulse generator G and/or timer T. Thus, with certain channels (e.g. those representing circuitous routes rather than direct transmission paths) the pulse cadence may have to be reduced and the interdigit pauses may have to be lengthened.

Distributor DR may be coupled with multiplexer S to shift the loading of register ME with newly arriving digits to stages just emptied whereby the retransmission of digits to the selected junction may commence long before the dialing of the call number has been completed. In that case, of course, the number of register stages may be less than the maximum number of digits in a call number.

I claim:

1. In a telecommunication system including a multiplicity of lines adapted to initiate outgoing calls to destinations identified by multidigit call numbers, said destinations being reachable through remote junctions served by a multiplicity of transmission paths and identified by a characteristic initial portion of a call number, switch means for temporarily connecting one of said transmission paths to a calling line, and a marker responsive to said characteristic portion for controlling said switch means, the combination therewith of storage means for the digits of a call number, said storage means comprising:

a register with a plurality of stages accommodating at least some of the digits in a call number.

distributing means for loading the digits of a call number, received from one of said lines, into respective stages of said register;

circuitry for the transfer of said characteristic portion of said call number from said register to said marker, with retention of the remaining digits in said register;

a generator of a train of readout pulses activatable by said marker upon reception of said characteristic portion and establishment of a connection between said one of said lines and a selected transmission path, said generator having an output lead extending to the connection so established for transmitting said readout pulses thereover;

counting means connected to said generator for receiving said readout pulses therefrom and registering a count thereof;

comparison means with a first input connected to said counting means and with a second input connectible to the stages of said register containing said remaining digits;

multiplexing means for sequentially connecting said second input to said stages;

gating means in said output lead controlled by said comparison means for blocking the transmission of said readout pulses in the presence of a match between said count and the contents of a stage of said register connected to said second input by said multiplexing means; and timing means responsive to said comparison means for deactivating said counting means during a predetermined interdigit pause and thereupon actuating said multiplexing means for connecting another stage of said register to said second input with concurrent unblocking of said output lead for transmission of the next digit over said connection.

2. The combination defined in claim 1 wherein said marker is provided with a memory having cells addressable by the constituent digits of said characteristic portion and decoding means connected to said memory for determining from the contents of the addressed cells the complete identification of a selected junction, said register having a stepping input energizable by said decoding means in the event of insufficient identification for reading out additional constituent digits to said marker.

3. The combination defined in claim 1 wherein said marker has an output circuit extending to said timing means for modifying the duration of said interdigit pause according to the nature of the established connection.

4. The combination defined in claim 1 wherein said marker has an output circuit extending to said generator for modifying said train of readout pulses according to the nature of the established connection.

* * * * *